United States Patent [19]
Chenowth

[11] Patent Number: 5,697,664
[45] Date of Patent: Dec. 16, 1997

[54] COVER FOR OPEN-TOPPED CONTAINER AND TIE-DOWN SYSTEM THEREFOR

[76] Inventor: Lynn Chenowth, 1581 Greenfield Dr., El Cajon, Calif. 92021

[21] Appl. No.: 636,068

[22] Filed: Apr. 22, 1996

Related U.S. Application Data

[63] Continuation of Ser. No. 258,933, Jun. 13, 1994, abandoned.
[51] Int. Cl.⁶ ..................................................... B60P 7/04
[52] U.S. Cl. ................................................................ 296/98
[58] Field of Search ........................ 296/98; 160/23.1, 160/238, 266, 267.1, 268.1, 269, 328, 329, 382

[56] References Cited

U.S. PATENT DOCUMENTS

| | | | |
|---|---|---|---|
| 2,811,321 | 10/1957 | Barre | 296/98 X |
| 3,627,376 | 12/1971 | Tyler | 296/98 |
| 4,023,857 | 5/1977 | Killion | 296/98 |
| 4,172,614 | 10/1979 | Guido, Jr. | 296/98 X |
| 5,125,713 | 6/1992 | Willingham et al. | 296/98 |

FOREIGN PATENT DOCUMENTS

| | | | |
|---|---|---|---|
| 305579 | 3/1989 | European Pat. Off. | 296/98 |

Primary Examiner—Andrew C. Pike
Attorney, Agent, or Firm—John R. Duncan; Frank D. Gilliam

[57] ABSTRACT

A system for deploying a cover over an open-topped container, such as a truck trailer, and for removing and storing the cover requires only a single operator who need not leave the ground. The fabric cover is rolled on a storage roller at one end of the opening which includes a drive mechanism tending to roll up the cover. A pull rod is secured to the cover free end, extending across the opening and including guide disks riding along the outer edge of the opening. The pull rod and cover are pulled across the opening with a pull rope attached to the pull rod, which locks in place at the second end of the opening. A plurality of tie-down straps are provided along the cover edges. A tie-down rope is threaded through loops at the ends of the straps and corresponding hooks along the side of the container to hold the sides in place. Side flaps extending down from the cover can be provided to seal the edges. The flaps are foldable up over the cover. The cover is rolled onto the storage roller with the folded flaps to open the container top.

12 Claims, 2 Drawing Sheets

5,697,664

COVER FOR OPEN-TOPPED CONTAINER AND TIE-DOWN SYSTEM THEREFOR

This is a continuation of application Ser. No. 08/258,933, filed on Jun. 13, 1994 now abandoned.

BACKGROUND OF THE INVENTION

This invention relates in general to covers for large open-topped compartments and, more specifically to a flexible cover that is easily installed over the top and tied down by a person standing on the ground.

Open-topped compartments, such as truck trailers, dump trucks, storage bins and the like used for hauling or storing particulate material such as grain, ash, lime, or the like, are subject to having the material fall or blow out onto the roadway. Exposure to rain, excessive sunlight, etc., is often damaging to materials being hauled or stored. With materials such as gravel, aggregate, or similar materials, having portions of a load fall onto a roadway is undesirable both from the point of view of littering and the danger of the material striking a following vehicle, possibly breaking a windshield or causing an accident. Where heated materials, such as asphalt, are being stored or carried, retention of heat within the container is very desirable.

Many localities now have laws requiring that all open-topped vehicle compartments be covered when containing loose or lightweight material. Often, the loads are simply covered with a tarpaulin that is tied to the edges of the open top at intervals around the opening. While sometimes effective, such tarpaulins are difficult for one person to put into place, especially in windy conditions. Often, it is necessary for the operator to climb on the vehicle or bin sides or across the load to secure the tarpaulin, at considerable personal danger. Installation is time consuming and must be carefully done to prevent an edge of the cover from loosening, allowing spillage of part of the load.

Attempts have been made to provide more convenient covers that are rolled or folded at one end of the compartment and can be unrolled or unfolded to cover the load. These arrangements are generally difficult to deploy and do not adequately secure the sides of the cover to the container sides.

Where the load is heaped, such as sand or dirt in a dump truck, the system disclosed in my prior U.S. Pat. No. 5,125,713, with Larry Willingham, is very effective in securing the material and is easily installed. However, with flat-topped bins or the like improvements in side tie-downs would increase the system's effectiveness.

Thus, there is a continuing need for improvements in deployable covers for open-topped compartments that will fully and uniformly restrain material loaded in the compartment along both the ends and sides of the compartment, can be easily moved into and out of the covering position by one person standing on the ground, and can extend over the sides and ends of the compartment for protection against rain or other outside contaminants.

SUMMARY OF THE INVENTION

The above-noted problems, and others, are overcome in accordance with this invention by a cover system for generally rectangular open-topped compartments which basically comprises a roller at a first end of the open top for holding a flexible cover sheet wrapped therearound, a means for unrolling the cover sheet, such as a line connected to a transverse member rigidly secured to the leading edge of the sheet to be manually pulled by a person standing at the second end of the container, a means for fastening the cover at the second end of the open top, a plurality of tie-down straps extending transversely across the cover and extending down both sides of the container, and means for securing the tie-down straps to the container in tension.

Preferably, the pulling line includes two short legs secured near the ends of the transverse rigid rod and secured to the pull line in a "Y"-like configuration. When the cover is rolled up, the pull line is wrapped around spaced hooks at the front end of the compartment. When the cover is deployed, any excess line is wrapped around similar spaced hooks at the aft end of the container.

For tensioning and securing the fully deployed cover, an elastic cord may be interposed in the pull line between the pull rod and the line securing hooks.

The tie down straps are preferably sewn to the cover and extend across the cover at regular intervals. The tie-down straps are connected to elastic cords, generally called "bungee" cords, which are fastened to the container sides in tension at selected intervals. For optimum tensioning and securing of the tie-down straps, one of several preferred embodiments should be used.

BRIEF DESCRIPTION OF THE DRAWINGS

Details of the invention, and of preferred embodiments thereof, will be further understood upon reference to the drawings, wherein.

DETAILED DESCRIPTION OF PREFERRED EMBODIMENTS

Figure 1:
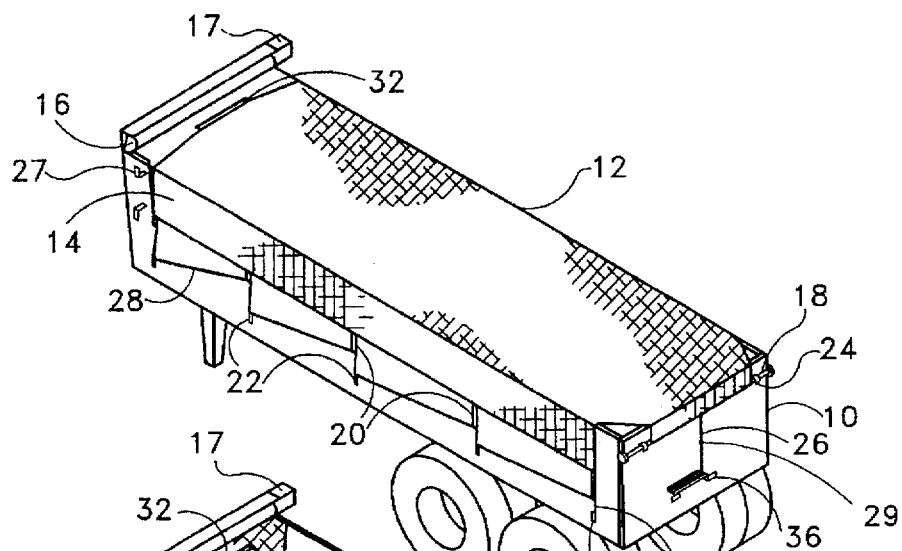
FIG. 1 is a perspective view of the cover of this invention deployed on a truck trailer.

Referring to FIG. 1, there is seen a conventional open-topped truck trailer 10 of the sort that might haul grain, alfalfa hay, sand, gravel, asphalt, or other materials. In some cases, a dumping mechanism may be included for raising the front of the trailer and an openable back for releasing the carried material. Or, various types of large valves could be installed on the bottom of the trailer for draining grain or the like from the trailer. These ancillary features of some trailers are not shown for clarity in illustrating the features of the invention. Any open topped trailer, storage bin, or the like could use the cover system of this invention.

For convenience of description, the deployable cover system is shown during the cover storage sequence. The cover deployment sequence is essentially the reverse of the storage sequence and will be described below.

As seen in FIG. 1, cover 12 entirely covers the open top of trailer 10 and includes side flaps 14 extending down over the trailer sides to prevent air from entering and disturbing the load, cooling hot material, etc. The cover extends from a storage roller 16 to a pull rod 18 which is fastened to the leading edge of the cover.

Cover 12 may be made from any suitable material. Typical materials include tightly woven polypropylene fabric, preferred for multipurpose applications, polyvinyl chloride coated mesh fabric, typically nylon or polyester fabric, preferred for sand, gravel, and the like since wind can pass through the fabric and decrease cover flapping, and urethane coated nylon fabric, which is waterproof and preferred for use with water sensitive loads, and hot asphalt to retain heat.

A plurality of straps 20 are secured to cover 12 and extend downwardly from flaps 14. Each of straps 20 has a loop in the free end of the strap through which a tie-down rope can be fed. A tie-down rope 28, having a ring at the aft end to which an elastic "bungee" cord 30 is hooked, passes through the loops at the ends of straps 20 to secure the straps to conventional hooks 12 that are part of trailer 10. Tie-down rope 28 extends from a crosspiece 32 secured to cover 12 near roller 16, through a "zig-zag" pattern of hooks 22 and loops at the ends of straps 20 to bungee cord 30 to a back hook 34. Bungee cord 30 maintains tie-down rope 28 taut and takes up any slack. Preferably, straps 20 extend all the way from one side of cover 12 from one side to the other and are sewn to the cover, so that tie-down stresses are primarily borne by the straps rather than the cover. Simply sewing short straps to edges of the cover has-been found to be undesirable, since that type of connection bears considerable stress and tends to tear loose.

In the fully deployed position shown in FIG. 1, pull rod 18 is held in place by hooks 24 and pull rope 26 is wrapped around conventional hooks 36 on the back of trailer 10. A bungee cord may be interposed in rope 26 at the back of the trailer to aid in maintaining tension on the cover and absorbing shocks.

Figure 2:
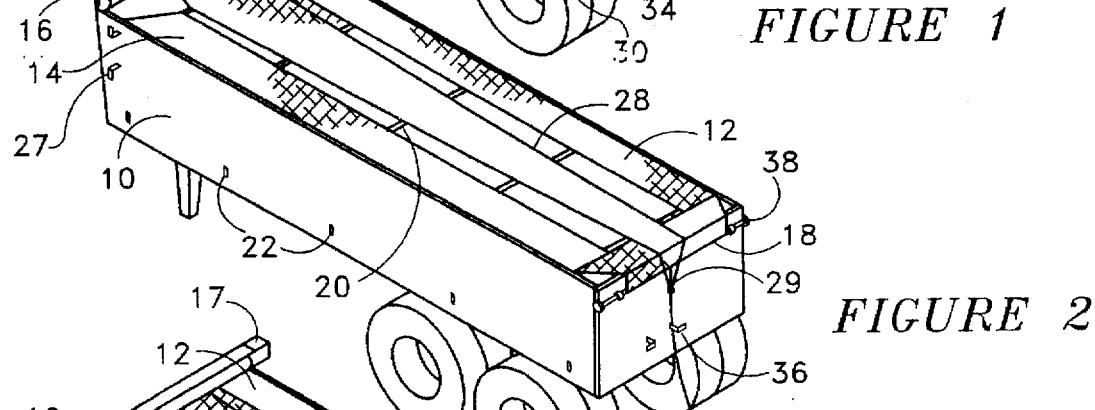
FIG. 2 is a perspective view of the cover during the initial, side flap release, step of the storage sequence.

When trailer 10 is to be uncovered, the operator initially unfastens tie-down ropes 28 from bungee cord 30 on each side of the trailer, then disconnects tie-down ropes 28 from hooks 22 at the ends of straps 20 on each side of the trailer. Tie-down ropes 28 are then pulled to a reasonably fore-and-aft line through the loops in the ends of straps 20. The straps 20 and flaps 14 are then flipped up onto the top of cover 12, with the ends of tie-down ropes 28 extending over the back of the trailer. The ends of tie-down ropes 28 are secured to pull rope 26 with conventional snap clips at the ends of ropes 28 snapping onto a ring 29 in rope 26 as seen in FIG. 2. Pull rope 26 is then uncoiled from storage hooks 36. Pulling tie-down ropes 28 toward the rear of the trailer tends to straighten them relative to crosspiece 32, so that the straps 20 and flaps 14 are pulled smoothly toward the centerline of the top and lie substantially flat on top of cover 12.

Crosspiece 32 has a length slightly less than the distance between flaps 14 when the flaps are in the position shown in FIG. 2.

Storage roller 16 includes conventional winding means 17, such as a spring motor tensioned when coves 12 is pulled from the roller, an electrical, or hydraulic motor, etc.

Figure 3:
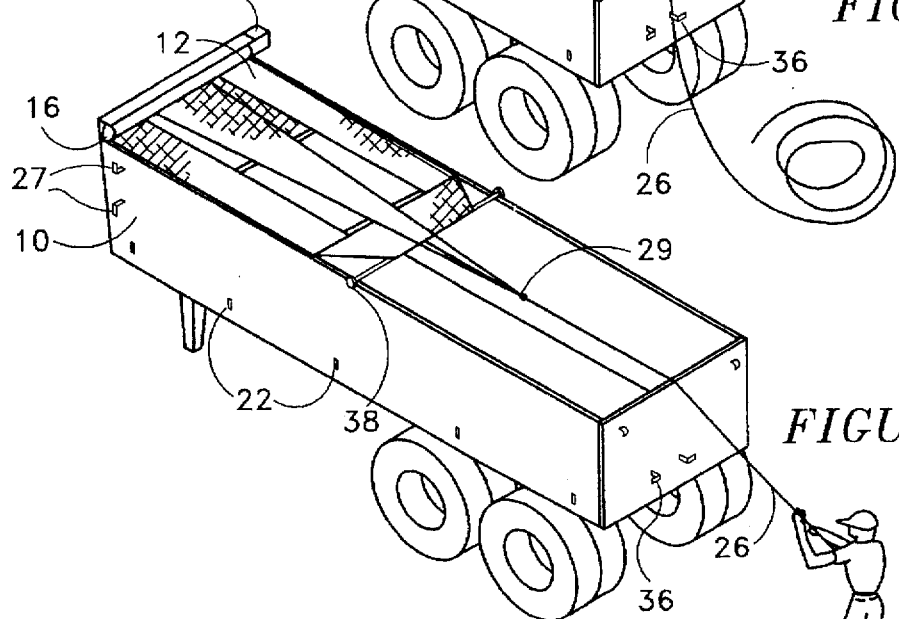
FIG. 3 is a perspective view of the cover during the rollup step of the storage sequence.

The operator pulls on pull rope 26 sufficiently to disengage pull rod 18 from hooks 24, then gradually feeds rope 26 out while storage roller 16 rolls up cover 12. Guide disks 38 on the ends of pull rod 18 move along the trailer top side edges to cause the cover to wind straight onto storage roller 16, as seen in FIG. 3.

When cover 12 is fully rolled onto storage roller 16, the operator flips the pull rope 26 to one side, then winds the pull rope around storage hooks 27 on the side of trailer 10 that are generally similar to back side hooks 36. The trailer may then be easily loaded or unloaded.

Covering the trailer is essentially the reverse operation to the described uncovering. Pull rope 26 is unwound from storage hooks 27 at the front of trailer 10, arranged down the side of the trailer, then flipped up onto the trailer. The operator then pulls rope 26 toward the rear of trailer 10, causing storage roller 16 to unwind (and build up tension, if a spring loaded roller) as cover 12 is drawn along the trailer top, guided by guide disks 38 on pull rod 18. When the cover reaches the rear end of the trailer, pull rod 18 is pulled just past hooks 24 and allowed to retract slightly to seat the pull rod in hooks 24.

Tie-down ropes 28 are unclipped from ring 29 in pull rope 26 and flipped off of each side of the trailer. A short pull on each tie-down rope 28 will cause flaps 14 to slip off of the top and hang down on the sides of the trailer. Tie-down ropes 28 are then pulled over hooks 22 and the end is fastened to bungee cord 30 and back hook 34. Bungee cord 30 allow sufficient stretch to make the hook-up and maintains tension in tie-down rope 28 and straps 20. Rope 26 is wrapped around hooks 36 and the trailer is ready for movement.

As can be seen, this cover system permits one person to easily and quickly cover or uncover the container top opening while always standing on the ground. No dangerous climbing on the trailer is necessary. While a trailer is shown as a preferred container, other containers such as storage bins and the like will benefit from this cover system.

Figure 4:
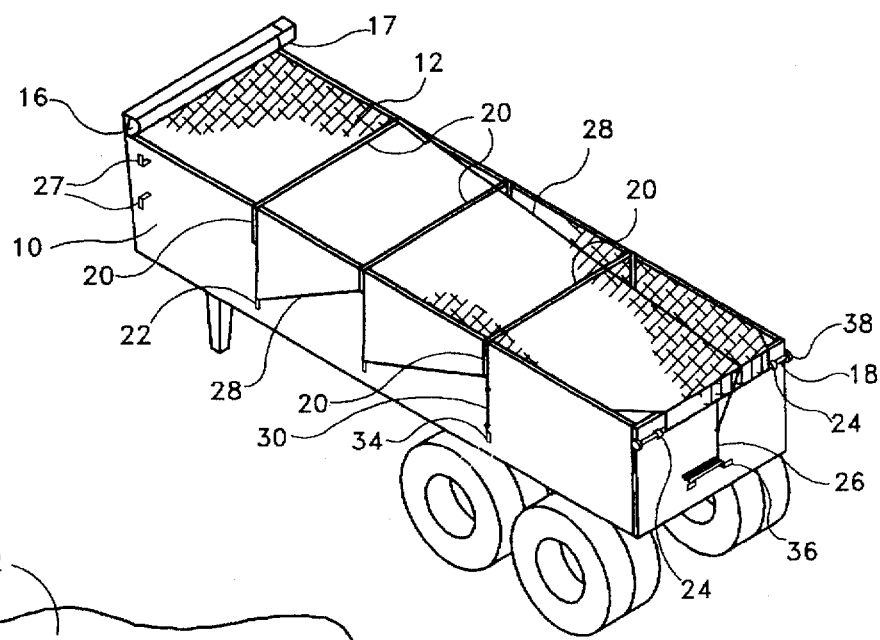
FIG. 4 is a perspective view of an alternative embodiment the cover of this invention deployed on a truck trailer.

FIG. 4 shows an alternative embodiment of the cover system of this invention. In this embodiment, side flaps 14 are omitted. Side flaps, while highly desired in many cases, may not be necessary with certain materials, such as sand, gravel, aggregate, and the like. As seen in FIG. 4, trailer 10, storage roller 16, pull rod 18, straps 20, and pull rope 26 are all the same as the corresponding components shown in FIGS. 1-3.

FIG. 4 shows the cover system nearly fully installed. Installation is complete on the near side, while uncovering has commenced on the far side. On the near side, tie-down rope 28 is threaded through loops at the ends of straps 20 and hooks 22 to a bungee cord 30 fastened to rearmost hook 34. This arrangement maintains cover 12 taut across the top of trailer 10. On the far side, tie-down rope 28 has been removed from hooks 22 has been flipped up onto the top of cover 12, carrying straps 20 with it. The end of tie-down rope 28 has been fastened to pull rope 26. After the near side tie-down rope 28 is similarly positioned, pull rope 26 is pulled to disengage pull rod 18 from hooks 24 and pull rope 26 is fed out while roller 16 rolls up the cover. As with the embodiment of FIGS. 1-3, pull rope 26 is wound around storage hooks (not seen) on the front of trailer 10 in a manner similar to hooks 36 as shown. These steps are reversed to deploy cover 12.

Figure 5:
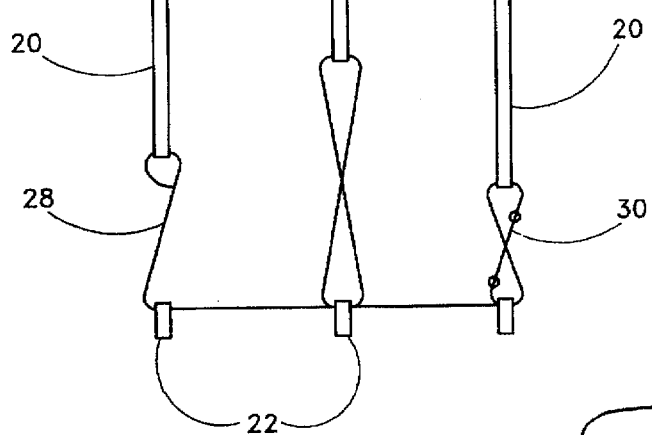
FIG. 5 is a side view of the trailer showing a first tie-down arrangement.
Figure 6:
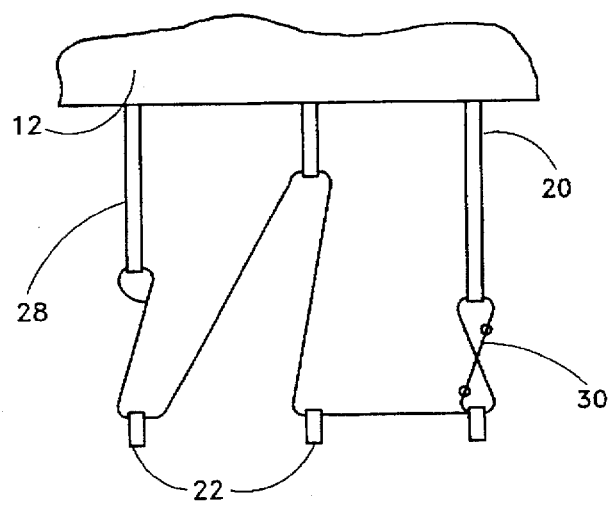
FIG. 6 is a side view of the trailer showing a second embodiment of the tie-down arrangement.

While the arrangement of tie-down ropes 28 with hooks 22 and straps 20 in a "zig-zag" pattern as shown in FIGS. 1 and 4 is preferred, other tie-down arrangements may be used as seen in FIGS. 5 and 6. As seen in FIG. 5, tie-down rope 28 may proceed from the forwardmost strap 20 down to forward hook 22, directly aft of second forward hook 22, up to second forward strap 20, back through second forward hook 22, to aft strap 20, to bungee cord 30 and back hook 34. This may be preferred where tie-down rope 28 needs to be relatively long. A combination of zig-zag and straight fore-and-aft hookup patterns may be used, as shown in FIG. 6. Other combinations may be used, depending upon the number of straps and hooks used (generally proportional to the length of the container), the length of tie-down rope 28 needed to extend over the top of the container to connect to pull rope 26 (as seen in FIG. 2 and the back side of FIG. 4), etc.

While certain preferred materials, dimensions, and arrangements have been detailed in conjunction with the above description of preferred embodiments, those can be varied, where suitable, with similar results. Other applications, variations, and ramifications of this invention will occur to those skilled in the art upon reading this disclosure. Those are intended to be included within the scope of this invention as defined in the appended claims.

I claim:

1. A deployable cover system for an open-topped compartment having first and second compartment ends, sides, and exterior side surfaces, said cover system comprising:

a storage roller means, at said first compartment end adjacent to a compartment open top, for holding a cover rolled therearound and for permitting said cover to be unrolled and rerolled;

said cover having an upper surface, a first end secured to said storage roller means, a free end opposite said first compartment end, and two longitudinal edges;

pull means, including a pull rod extending entirely across said open top parallel to said first compartment end and secured to said free end of said cover, for pulling said free end of said cover from said storage roller means across said open top to said second compartment end in a pulling direction;

means for securing said free end of said cover at said second compartment end with said cover in a position fully covering said open top;

flaps fastened along each of said longitudinal edges movable between a first position extending down said exterior side surfaces of said compartment and a second position folded over said upper surface of said cover;

a plurality of spaced tie-down straps secured to said cover and having free ends extending from said flaps at least partially down said exterior side surfaces of said compartment in a direction generally transverse to said pulling direction;

each of said tie-down straps having a loop at said free end thereof;

two tie-down ropes attached to said first end of said cover generally centrally of said first end of said cover;

each of said tie-down ropes extending through said loops down one side of said cover; and attachment means for securing said tie-down ropes to said exterior side surfaces of said compartment.

2. The cover system according to claim 1 further including a crosspiece fastened near said first end of said cover, said tie-down ropes being secured to ends of said crosspiece; said flaps when folded having a distance therebetween slightly greater than a length of said crosspiece.

3. The cover system according to claim 1 wherein said attachment means comprises hooks on each corresponding exterior side surface of said compartment to engage said tie-down ropes to hold said flaps against each said exterior side surface.

4. The cover system according to claim 3 further including an elastic cord between an end of each tie-down rope and a hook for holding each said tie-down rope in tension.

5. The cover system according to claim 1 wherein said pull means further includes a pull rope for pulling said pull rod and said cover across said open top and storage hooks at said second end of said compartment to store said pull rope when said cover is deployed.

6. The cover system according to claim 5 further including storage hooks at said first compartment end to store said pull rope when said cover is rolled on said storage roller means.

7. The cover system according to claim 1 wherein said pull rod includes enlarged end portions which ride along outside edges of said compartment as said pull rod and said cover are moved along said compartment.

8. The cover system according to claim 1 wherein said storage roller means includes winding means tending to roll up said cover on said storage roller means and maintain tension on said cover when said cover is extended.

9. A method of covering and uncovering an open top of a compartment having sides, forward and aft ends, and said open top, which comprises the steps of:

securing a first sheet end of a sheet of flexible material, to a storage roller at said forward end of said open top, said sheet having a surface at least equal to an area of said open top of said compartment and a second end extendable over said open top to said aft end of said open top;

securing a crosspiece to said sheet adjacent to said first end of said sheet;

securing first ends of tie-down ropes to ends of said crosspiece;

maintaining said sheet rolled on said roller when not in use as a cover;

pulling said second end of said sheet across said open top;

securing said second sheet end to said compartment at said aft end of said open top;

maintaining said sheet in tension between said first and second sheet ends;

threading second ends of said tie-down ropes through loops at second ends of straps having first ends secured to free edges of flaps fastened along sides of said sheet;

moving said flaps to a deployed position by moving said second ends of said tie-down ropes to positions along said sides of said compartment at said aft end of said compartment and pulling said second ends of said tie-down ropes to pull said flaps over said sides of said compartment;

moving said flaps to a stored position by moving said second ends of said tie-down ropes to a position at about a center of said aft end of said compartment;

flipping said tie-down ropes and said flaps onto said open top of said compartment over said sheet and pulling said second ends of said tie-down ropes; and rotating said storage roller to roll up said sheet.

10. The method according to claim 9 including a further step in moving said flaps to said deployed position of connecting said tie-down ropes at intermediate lengths thereof to a plurality of hooks fastened to said sides of said compartment and securing said second ends of said tie-down ropes to said compartment in tension.

11. The method according to claim 10 further including the steps of threading each of said tie-down ropes from a forwardmost said strap to a forwardmost said hook, thence to a second forward said strap and to a second forward said hook, and similarly to each succeeding said strap and said hook.

12. The method according to claim 10 further including the steps of threading said tie-down ropes in at least one instance from one said hook to a next said hook.

* * * * *